(12) United States Patent
Crabbé et al.

(10) Patent No.: US 7,971,312 B2
(45) Date of Patent: Jul. 5, 2011

(54) CONNECTING ELEMENT FOR WIPER

(75) Inventors: Rudi Crabbé, Linter (BE); Wolfgang Thomar, Essen (DE); David Van Baelen, Winksele (BE); Paul Criel, St. Truiden (BE); Yves Janssis, Sint-Truiden (BE)

(73) Assignee: Robert Bosch GmbH, Stuttgart (DE)

( * ) Notice: Subject to any disclaimer, the term of this patent is extended or adjusted under 35 U.S.C. 154(b) by 473 days.

(21) Appl. No.: 12/159,315

(22) PCT Filed: Nov. 8, 2006

(86) PCT No.: PCT/EP2006/068210
§ 371 (c)(1),
(2), (4) Date: Sep. 22, 2008

(87) PCT Pub. No.: WO2007/073974
PCT Pub. Date: Jul. 5, 2007

(65) Prior Publication Data
US 2009/0188069 A1 Jul. 30, 2009

(30) Foreign Application Priority Data
Dec. 27, 2005 (DE) .................. 10 2005 062 463

(51) Int. Cl.
*B60S 1/38* (2006.01)
*B60S 1/40* (2006.01)

(52) U.S. Cl. .................. 15/250.32; 15/250.43
(58) Field of Classification Search ........... 15/250.32, 15/250.43, 250.44, 250.201, 250.451, 250.361
See application file for complete search history.

(56) References Cited

U.S. PATENT DOCUMENTS

| 3,390,416 A * | 7/1968 | Scinta .................. 15/250.32 |
| 6,209,166 B1 * | 4/2001 | Westermann et al. ..... 15/250.32 |
| 6,581,237 B1 * | 6/2003 | Kotlarski .................. 15/250.32 |
| 6,634,055 B1 | 10/2003 | De Block |

FOREIGN PATENT DOCUMENTS

DE   202004013172 U1   10/2004

OTHER PUBLICATIONS

PCT/EP2006/068210 International Search Report.

* cited by examiner

*Primary Examiner* — Gary K Graham
(74) *Attorney, Agent, or Firm* — Michael Best & Friedrich LLP

(57) ABSTRACT

The invention relates to a connecting element (22) for hingedly connecting a wiper blade (10) to a wiper arm, said wiper blade (10) having a wiper strip (12) and at least one sprung blade (20) inserted into the wiper strip (12). Said sprung blade projects beyond the wiper strip (12) in the area of the connecting element (22) and is enclosed by guide rails (30) that are interlinked by at least one spring clip (34) and secured in the longitudinal direction of the wiper blade (10) by at least one locking element (38) which laterally engages with a recess (28) of the sprung blade (20).

6 Claims, 3 Drawing Sheets

CONNECTING ELEMENT FOR WIPER

BACKGROUND OF THE INVENTION

The invention is based on a connecting element.

A connecting element for hingedly connecting a wiper blade to a wiper arm is known from DE 198 60 644 A1. The connecting element is fastened to the wiper blade which has a wiper strip with two lateral longitudinal grooves. Two spring blades as supporting elements are inserted into the latter and protrude laterally for a distance from the wiper strip. The connecting element, which is produced from a plastic material, has two guide rails with a U-shaped cross-sectional profile, with the open sides of the guide rails facing each other. The guide rails, which are interlinked via a spring clip, are pushed in the longitudinal direction onto the protruding parts of the spring blades and, in their end position, latch to the spring blades. Recesses in the spring blades, which recesses interact with locking elements which are arranged on the spring tongues of the guide rails, are used for this purpose.

The connecting element has bearing elements in the form of bearing pins which are arranged on the outsides of the guide rails. In order to fit the connecting element, the guide rails can be compressed elastically for a distance because of the elasticity of the spring clip, and therefore the bearing pins can be inserted into corresponding bearing bores of an end piece of the wiper arm. The end piece is produced from metal, for example from sheet metal. After the connecting element is fitted to the wiper arm, the fitting to the wiper blade takes place. In the operating position, the side walls of the wiper arm lock the spring tongues by means of the locking elements, and therefore an unintentional release or displacement of the connecting element is avoided. The spring clip extends transversely with respect to the longitudinal direction of the guide rails and therefore forms a clearance in order to be able to push the connecting element, if appropriate, over a spoiler profile of the wiper blade.

SUMMARY OF THE INVENTION

According to the invention, the connecting element is composed of a plastic securing part and a metal bearing part. In this case, the securing part, by means of its guide rails, can laterally enclose the spring blade or the spring blades. For the lateral guidance, the bearing part has, at its ends, lateral guide angle brackets which are integrally formed on a bottom of the bearing part. They form a large supporting base when moments occur about a normal axis, thus ensuring good lateral guidance of the wiper blade.

The guide angle brackets have lugs on their sides facing away from the end walls, which lugs can be bent inward about a neutral axis extending parallel to the normal axis, with a respective bent leg engaging from below with the guide rails of the securing part. The connecting element is thereby secured in the direction of the normal axis by the bearing part. At the same time, the bearing part is made from wear-resistant, dimensionally stable metal, for example sheet metal, and is insulated from the spring steel spring blades by the plastic securing part, and therefore oscillations are damped and corrosion is avoided. The connecting element according to the invention results in a precise, stable and wear-resistant hinge connection between the wiper arm and the wiper blade with excellent lateral guidance of the wiper blade.

In an advantageous refinement, the securing part has, at its ends, end walls which, in particular, project outward over the contours of the guide rails. The spring clip extends in a plane parallel to the spring blade. The bearing part which covers the securing part can therefore be kept flat and fitted between the end walls of the securing part while it is secured in the longitudinal direction by the locking elements on the guide rails of the securing part. Instead of this means of securing by a form-fitting locking element, in an embodiment which is subjected to less stress, for example in the case of small rear wipers, a frictional connection can also be provided.

According to one refinement of the invention, the end walls each form a gap which is bridged by a respective spring clip. The open side of the spring clip therefore points toward the end of the securing part while the closed bow of the spring clip lies between the guide rails.

The bearing part is expediently formed from sheet metal, with side walls which support at least one bearing element, for example a bearing bushing or a bearing pin or other suitable bearing elements as known from the prior art, being bent upward in the central region of its longitudinal sides.

BRIEF DESCRIPTION OF THE DRAWINGS

Further advantages emerge from the description below of the drawing. The drawing illustrates an exemplary embodiment of the invention. The drawing, the description and the claims contain numerous features in combination. A person skilled in the art will expediently also consider the features individually and put them together to form meaningful further combinations.

In the drawing.

DETAILED DESCRIPTION

Figure 1:
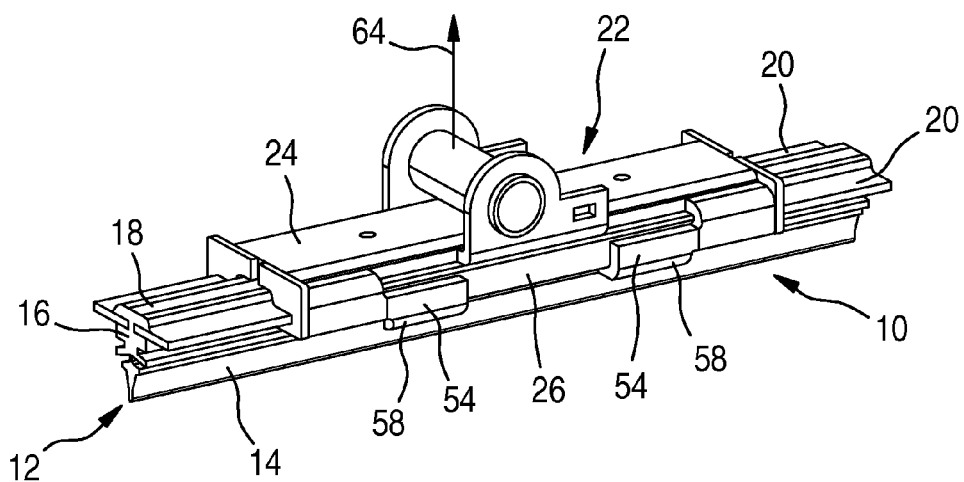
FIG. 1 shows a perspective view from above of a connecting element according to the invention on a wiper blade.
Figure 2:
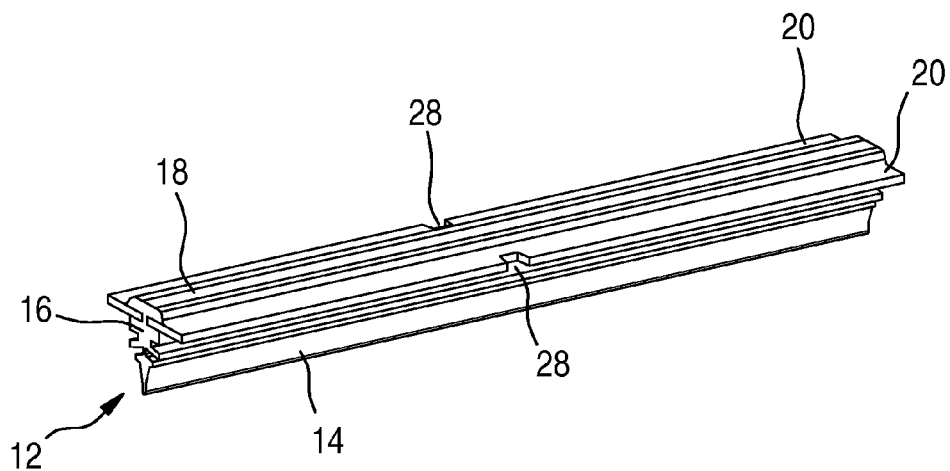
FIG. 2 shows a perspective view of a wiper strip with spring blades inserted.

A connecting element 22 is fitted on a wiper blade 10. It has a metal bearing part 24, preferably made of sheet metal, and a plastic securing part 26. The wiper blade 10 comprises a wiper strip 12 with a wiper lip 14, a head strip 16 and a back strip 18. Spring blades 20 are inserted into two longitudinal grooves between the back strip 18 and the head strip 16 and protrude for a distance from the grooves.

In the event that the wiper blade 10 has only one spring blade 20 in a central longitudinal channel, the longitudinal channel is laterally open in the region of the connecting element 22 such that the spring blade 20 is free for a distance on both sides, and therefore the securing part 26 can be fastened on it.

Figure 3:
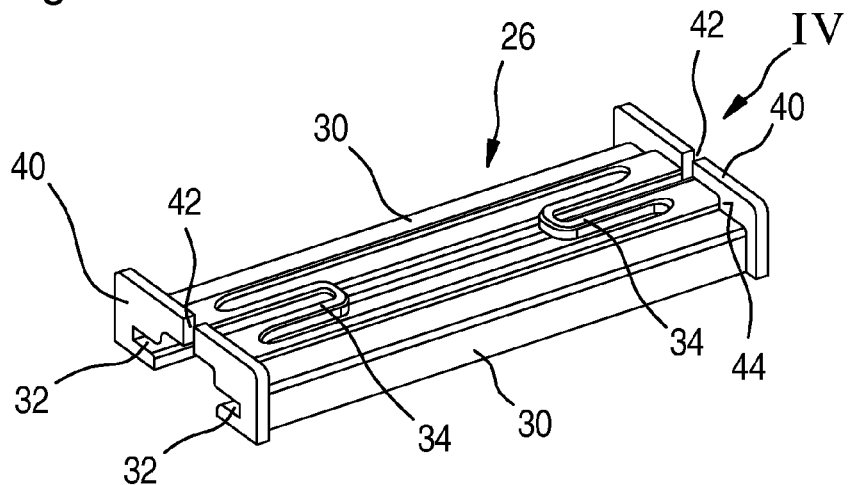
FIG. 3 shows a perspective view of a securing part.
Figure 4:
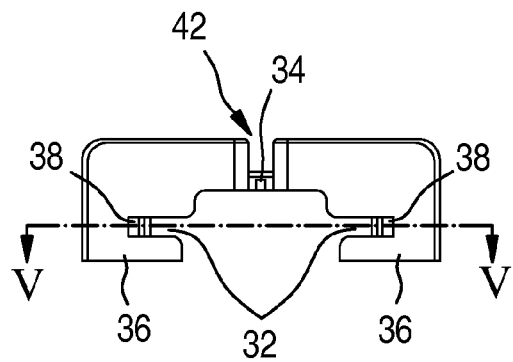
FIG. 4 shows a view of a securing part in the direction of an arrow IV in FIG. 3.
Figure 5:
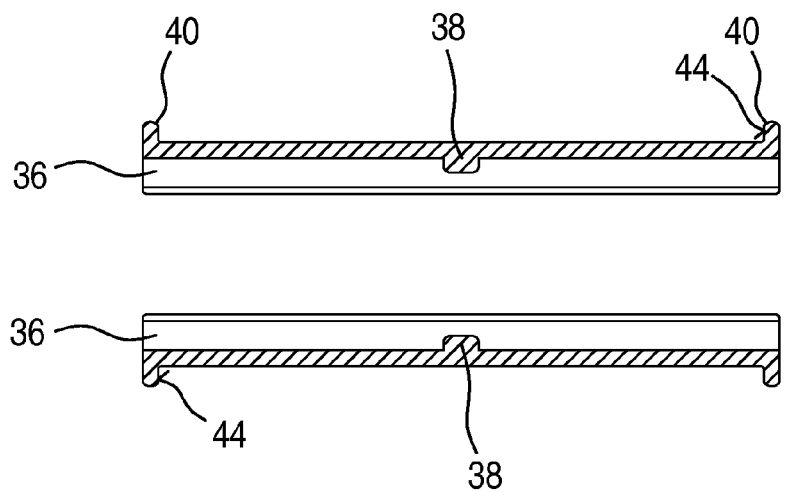
FIG. 5 shows a section corresponding to the line V-V in FIG. 4.
Figure 6:
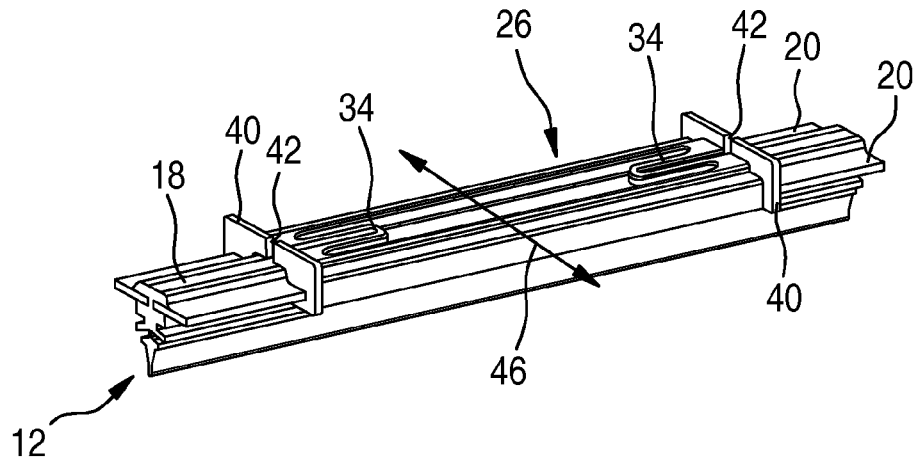
FIG. 6 shows a perspective view of a fitted securing part.
Figure 7:
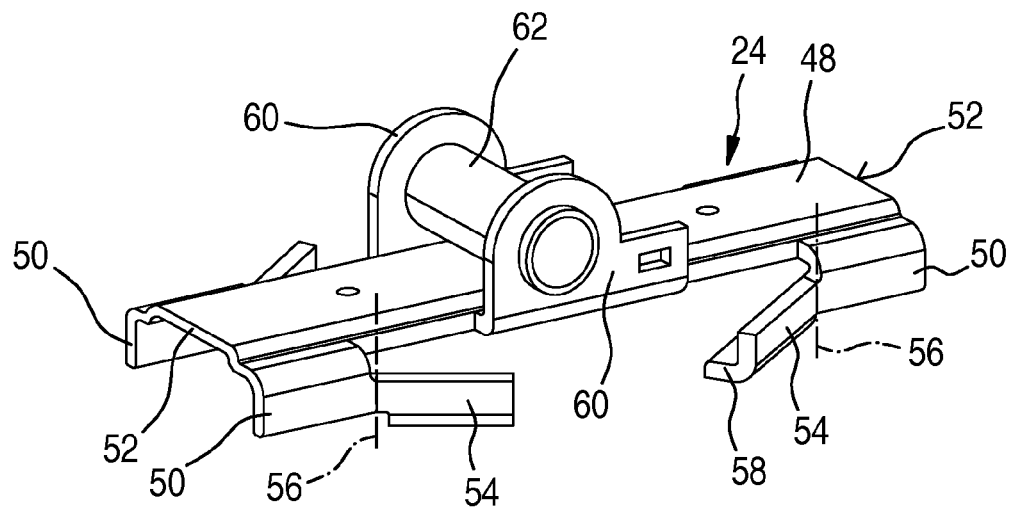
FIG. 7 shows a perspective view of a bearing part.

The fastening part 26 (FIG. 3 to FIG. 5) has two guide rails 30 which have guide grooves 32 in which the spring blades 20 engage in the fitted state. The open sides of the guide grooves 32 face each other. They are delimited by a lower groove flank 36 which bears against the lower side of the spring blades 20.

The guide rails 30 are interlinked by spring clips 34. The latter lie in a plane parallel to the spring blades 20, thus resulting in a flat construction. End walls 40 are provided at the ends of the guide rails 30 and, at each end, form a gap 42 which is bridged by the spring clip 34. The end walls 40 project outward for a distance over the contour of the guide clips and form bearing surfaces 44 which ensure that the bearing part 24 which is fitted is fixed axially.

The guide rails 30 have locking elements 38 in the guide grooves 32. In the fitted state, said locking elements engage in corresponding recesses 28 of the spring blades 20 and therefore secure the axial position of the securing part 26 relative to the spring blades 20. For the fitting, the guide rails 30 are pulled apart elastically transversely with respect to the wiper blade 10 in the direction of the arrow 46 and are placed onto the spring blades 20 such that the latter engage in the guide grooves 32 and the locking elements 38 of the guide rails 30 latch into the recesses 28 of the spring blades 20. In order to lock the securing part 26, the bearing part 24 is fitted between the bearing surfaces 44 of the end walls 40. The bearing part 24 is guided here laterally by guide angle brackets 50 on the guide rails 30 of the securing part 26. Since the guide angle brackets 50 at the ends of the bearing part 24 are integrally formed on a bottom 48, a large supporting base is produced for bending moments about a normal axis 64, thus resulting in very good lateral guidance of the wiper blade 10.

Lugs 54 which are bent inward about a neutral axis 56 during the fitting are integrally formed in the longitudinal direction on the mutually facing end sides 52 of the guide angle brackets 50. In this case, a bent leg 58 of the lug 54 engages from below with the guide rail 30 of the securing part 26 such that the bearing part 24 is secured in the direction of the normal axis 64. Furthermore, the securing part 26 is blocked by the bearing part 24, and it cannot therefore be released from the spring blades 20 or displaced thereon.

The bearing part 24, which is preferably manufactured from sheet metal, has two upwardly bent side walls 60 which hold, as the bearing element, a bearing bushing 62 for a bearing pin which is connected to a wiper arm (not illustrated). Instead of the bearing bushing 62, the bearing part 24 can have other bearing elements, such as, for example, bearing bolts, bearing pins, bearing rollers or the like, as known from the prior art.

The invention claimed is:

1. A connecting element (22) for hingedly connecting a wiper arm to a wiper blade (10) which has a wiper strip (12) and at least one spring blade (20) which is enclosed by guide rails (30) of the connecting element (22), which guide rails are interlinked by at least one spring clip (34), wherein the guide rails (30) and the spring clip (34) are produced from a plastic material, characterized in that the connecting element is composed of a plastic securing part (26) and a metal bearing part (24), the securing part (26), by means of its guide rails (30), being able to laterally enclose the spring blade (20), in that the spring clip (34) extends in a plane parallel to the spring blade (20), in that the bearing part (24) covers the securing part (26) and has lateral guide angle brackets (50) which are integrally formed on a bottom (48) of the bearing part (24) and have lugs (54) which can be bent inward about a neutral axis (56) extending parallel to a normal axis (64), with a respective bent leg (58) engaging from below with the guide rails (30) of the securing part (26).

2. The connecting element as claimed in claim 1, characterized in that the spring blade (20) and the securing part (26) are secured with respect to each other via a locking element (38) which engages in a recess (28), in that the securing part (26) has, at its ends, end walls (40) which project over contours of the guide rails (30), and in that the bearing part is fitted between the end walls (40).

3. The connecting element (22) as claimed in claim 2, characterized in that the end walls (40) each form a gap (42) which is bridged by a respective spring clip (34).

4. The connecting element (22) as claimed in claim 3, characterized in that the bearing part (24) is formed from sheet metal, with side walls (60), which support at least one bearing element (62), being bent upward in the central region of its longitudinal sides.

5. The connecting element (22) as claimed in claim 2, characterized in that the bearing part (24) is formed from sheet metal, with side walls (60), which support at least one bearing element (62), being bent upward in the central region of its longitudinal sides.

6. The connecting element (22) as claimed in claim 1, characterized in that the bearing part (24) is formed from sheet metal, with side walls (60), which support at least one bearing element (62), being bent upward in the central region of its longitudinal sides.

* * * * *